May 20, 1952 — C. W. NORTH — 2,597,168
OPTICAL BENCH
Filed Feb. 24, 1948 — 2 SHEETS—SHEET 1
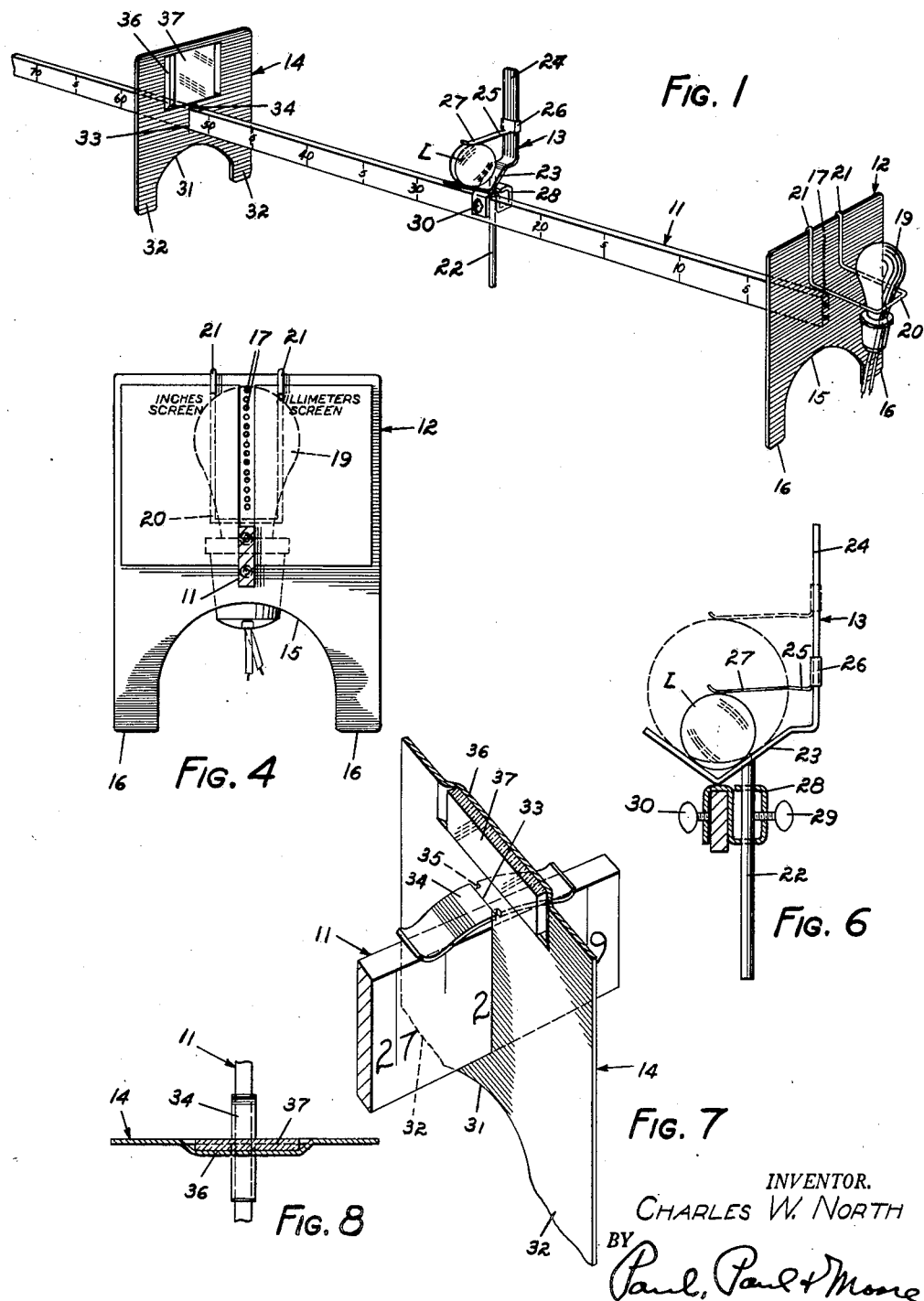

May 20, 1952  C. W. NORTH  2,597,168
OPTICAL BENCH
Filed Feb. 24, 1948  2 SHEETS—SHEET 2
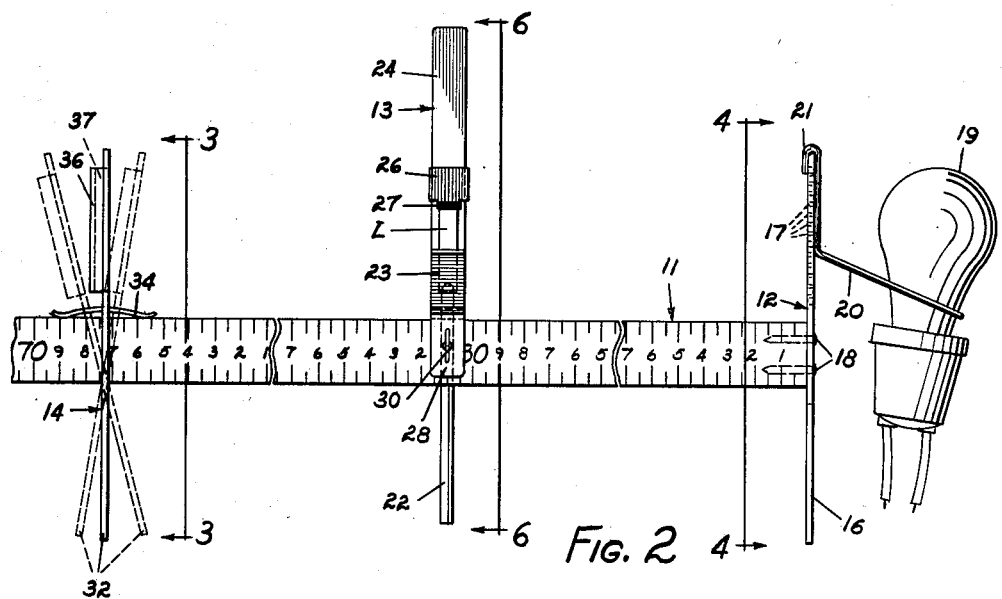
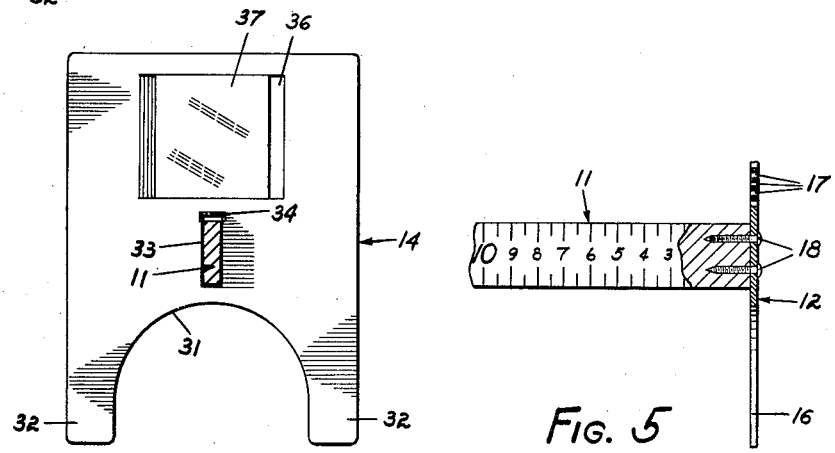
INVENTOR.
CHARLES W. NORTH
BY
Paul, Paul & Moore
ATTORNEYS Patented May 20, 1952

2,597,168

UNITED STATES PATENT OFFICE 2,597,168

OPTICAL BENCH

Charles W. North, Excelsior, Minn.

Application February 24, 1948, Serial No. 10,310

7 Claims. (Cl. 88—1)

This invention relates to an optical bench which is particularly adapted for measuring focal lengths of lenses. The device is extremely simple in construction and is adapted for ease of operation. The various elements involved in the structure are readily adjustable to the various positions necessary, and, at the same time, the device is so constructed as to accurately provide the information necessary relative to the lenses to be measured.

It is, therefore, an object of the present invention to provide an optical bench which is simple in construction, and capable of ready adjustment for the purpose of taking desired measurements of optical lenses.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

In the drawings:

Figure 1 presents a perspective of the assembled apparatus, showing the various elements supported upon a measuring device, the elements being composed of a light source, a reticle plate, a lens support, and a mirror support;

Figure 2 is a side elevation of the assembled device;

Figure 3 is a cross-sectional view on the line 3—3 of Figure 2;

Figure 4 is a side elevation taken on the line 4—4 of Figure 2, showing the details of the reticle plate;

Figure 5 is a fragmentary side elevation partly in section showing one way in which the reticle plate may be secured to the measuring device;

Figure 6 is a cross-sectional view on the line 6—6 of Figure 2, showing the lens holder;

Figure 7 is a fragmentary perspective showing the mounting of the mirror support on the measuring device; and Figure 8 is a fragmentary plan view of Figure 7.

With particular reference to Figure 1, the novel device herein disclosed is shown composed of a measuring stick 11 which may be of any suitable material, and for convenience, may be a typical meter measuring stick having metric measuring units on one side and the British measuring units on the other. A suitable reticle plate 12 is secured to one end of the measuring stick by suitable screws 18, as best shown in Figure 5.

Intermediate to the ends of the measuring stick 11 there is mounted an adjustable lens support 13, the details of which will be pointed out more fully hereinafter. An adjustable mirror support, generally designated by the numeral 14 is also mounted on the measuring stick and is longitudinally adjustable thereon, which will likewise be discussed later.

With reference to the reticle plate, it may be composed of any suitable sheet material and preferably may be stamped out of sheet metal. It is preferably rectangular in shape and has a cutout portion 15 at its bottom which serves to provide a pair of spaced legs 16. The reticle plate is provided with a series of apertures 17 along its medial line which serve the purpose of producing an optical image, as will be pointed out hereinafter. The reticle plate is attached to the measuring stick by the screws 18, as hereinbefore stated.

A light source 19, which may be of any suitable type as, for example, a conventional Mazda lamp bulb, is shown supported behind the reticle plate by means of a wire support 20, which surrounds the lamp bulb and has hooks 21 formed at the ends of its spaced legs adapted to engage the top edge of the reticle plate, as shown in Figure 2.

The lens support 13 which is disposed intermediate the ends of the measuring stick 11, is shown composed of an upright rod 22 at the top of which is mounted a bracket member 23, the bottom portion of which is generally V-shaped, and which has an upstanding guide portion 24. The lens clamping member 25 is mounted for vertical adjustment upon the upright guide 24, and is composed of a sliding portion 26 which slides upon the guide member 24, and a spring arm portion 27 extending laterally from the slide portion 26 and adapted to engage the top edge portion of a lens L, supported in the bracket 23.

The upright post or rod 22 passes through holes in a clamping device generally designated by the numeral 28, and is held therein by means of a wing screw 29. The clamping device also extends in a general U-shape around the measuring stick and may be adjustably secured thereto in adjusted position by a similar wing screw 30.

The mirror support 14 is shown of substantially the same configuration as the reticle plate 12, and has a cutout portion 31 providing spaced legs 32. In the approximate center of the plate 14 there is provided an opening 33 through which the measuring stick passes. With particular reference to Figure 7, the mirror plate 14 is supported on the measuring stick by means of a spring element 34 which has a pair of notches 35 in its side edges, as shown. As will be seen, the spring element 34 is of a width greater than the width of the measuring stick, and is also wider than the aperture 33 in the mirror support 14. The notches 35 therefore engage the edges of the aperture 33 and assist in maintaining the mirror support approximately at right angles to the measuring stick 11.

The mirror support 14 is shown provided with a depressed portion 36 which may be made by merely off-setting the central portion of the plate from the median plane of the plate. Suitably fastened to this depressed portion is a mirror 37 which preferably is a front surface mirror. By means of the depressed portion 36, the front surface of the mirror is in the same plane as the plane of the mirror support 14, and, accordingly, it is possible to measure distances from the mirror's surface by reference to the point by which the measuring stick passes through the mirror support.

This optical bench herein disclosed is capable of performing several different functions. For measuring the focal length of a lens, the device is assembled, as indicated in Figure 1. A monochromatic light, such as a Mazda light bulb, provides the illumination behind the reticle plate. The lens L to be measured is mounted in the lens support. The mirror plate 14 is then adjusted so that the reticle pattern appears near by in the center of the mirror. The lens is then placed near the mirror plate and is adjusted along the length of the measuring stick until the image appears on one of the screens. At this tentative reading, the mirror plate is moved directly behind the lens and adjusted for the sharpest possible image on the screen, corresponding to the consistence of the length to be made. The focal length may then be read directly in the desired scale and thus the distance from the reticle plate to the lens support.

For collimation, an objective lens may be set up in the holder 11, by adjusting the focal length as described above. When the lens has been positioned at its correct focal length, the lens holder is secured in position on the measuring stick 11, and the light emerging from the lens will be parallel and a dependable collimation will be formed. The mirror plate 14 may then be removed from the measuring stick and inverted thereon so that its cutout portion 31 will permit an unobstructed view along the axis of the lens. By means of additional lens supports, a lens system or a completed instrument may be collimated for infinity.

For setting up a lens system, the device is assembled with the mirror plate 14 symmetrical with the reticle plate 13, and the light instrument is then inverted. Any suitable number of lens supports 13 may then be mounted on the measuring stick and a suitable lens system created. The cutout portions 15 and 31 in the reticle plate and the mirror plate, respectively, then permit an unobstructed passage of light through the lens system, and the device can be used as a completed instrument for viewing selected objects.

It will be apparent from the above description that the device described is simple in construction, is easy to operate, and at the same time permits accurate measurement of scale length and the performance of other optical functions.

While various modifications of the invention have been described, it is to be understood that the same is not limited thereto but may be varied within the scope of the following claims.

What I claim is:

1. In an optical bench, an elongated measuring member generally rectangular in cross-section, a lens supporting device comprising clamping means having a generally U-shaped portion adapted to embrace the measuring member, fastening means on one arm of said U-shaped portion for fastening said clamping means to the measuring member, said clamping means having a channel shaped portion extending at right angles from the end of the other arm of said U-shaped portion, aligned apertures in the horizontal webs of said channel portion, a vertically disposed stem adjustably supported in said holes, a generally V-shaped lens engaging member secured to the top of said stem with its apex disposed approximately over the center of the bottom of said U-shaped clamping portion, an upright carried by the V-shaped member and extending generally vertically from one arm of the V, and a spring finger adjustably mounted on said upright and extending outwardly over the open end of the V-shaped member and cooperating therewith to support a lens with the axis substantially parallel to the measuring member.

2. In an optical bench, an elongated measuring member generally rectangular in cross-section, a lens supporting device comprising clamping means having a generally U-shaped portion adapted to embrace the measuring member, fastening means on one arm of said U-shaped portion for fastening said clamping means to the measuring member, said clamping means having a channel shaped portion extending at right angles from the end of the other arm of said U-shaped portion, aligned apertures in the horizontal webs of said channel portion, a vertically disposed stem adjustably supported in said holes, a generally V-shaped lens engaging member secured to the top of said stem with its apex disposed approximately over the center of the bottom of said U-shaped clamping portion, an upright carried by the V-shaped member and extending generally vertically from one arm of the V, and a spring finger adjustably mounted on said upright and extending outwardly over the open end of the V-shaped member and cooperating therewith to support a lens with the axis substantially parallel to the measuring member, said V-shaped member and said spring finger contacting the peripheral edge only of said lens, whereby unobstructed vision is provided throughout the entire remaining area of said lens.

3. In an optical bench, an elongated measuring member generally rectangular in cross-section, a lens supporting device comprising clamping means having a generally U-shaped portion adapted to embrace the measuring member, fastening means on one arm of said U-shaped portion for fastening said clamping means to the measuring member, said clamping means having a channel shaped portion extending at right angles from the end of the other arm of said U-shaped portion, aligned apertures in the horizontal webs of said channel portion, a vertically disposed stem adjustably supported in said holes, a generally V-shaped lens engaging member secured to the top of said stem with its apex disposed approximately over the center of the bottom of said U-shaped clamping portion, an upright carried by the V-shaped member and extending generally vertically from one arm of the V, and a spring finger adjustably mounted on said upright and extending outwardly over the open end of the V-shaped member and cooperating therewith to support a lens with the axis substantially parallel to the measuring member, said V-shaped member and said spring finger being flat-surfaced and contacting the peripheral edge of said lens only at three points, whereby an unobstructed view is provided throughout the entire remaining surface of said lens.

4. In an optical bench having an elongated measuring member, a lens supporting device comprising clamping means having a first channel shaped portion adapted to embrace said elongated measuring member, fastening means on one web of said channel portion for fastening said clamping means to said measuring member, said channel means having a second channel means extending from the other web of said first channel means, aligned apertures in the webs of said second channel means, a stem adjustably supported in said apertures, a cradle means adapted for receiving the bottom of a lens therein secured to the top of said stem, an upright carried by said cradle means and extending generally vertically from one edge thereof, and resilient means adjustably mounted on said upright and extending outwardly over the open portion of said cradle means and cooperating therewith to support a lens with the axis substantially parallel to said elongated measuring member.

5. The apparatus of claim 4 further characterized in that said resilient means comprises a spring finger extending outwardly over the open portion of said cradle means, said spring finger being adapted in cooperation with said upright for slidable adjustment thereon.

6. The apparatus of claim 4 further characterized in that the center of said cradle means is disposed approximately over the center of the bottom of said elongated measuring member and said upright is attached to said cradle means in off-set relation to said center.

7. The apparatus of claim 4 further characterized in that said cradle means is adapted for cooperation with said spring finger whereby a lens of varying size may be supported with its axis substantially parallel to said elongated measuring member and with its axis disposed in substantially vertical relation thereto.

CHARLES W. NORTH.

REFERENCES CITED

The following references are of record in the file of this patent:

UNITED STATES PATENTS

| Number | Name | Date |
| --- | --- | --- |
| 562,424 | Ritchie | June 23, 1896 |
| 703,729 | Kupper | July 1, 1902 |
| 730,016 | Hein | June 2, 1903 |
| 996,017 | Haynes | June 20, 1911 |
| 1,047,000 | De Zeng | Dec. 10, 1912 |
| 1,057,262 | Oldfield | Mar. 25, 1913 |
| 1,088,137 | Fidjeland | Feb. 24, 1914 |
| 1,118,187 | Depue | Nov. 24, 1914 |
| 1,309,359 | Kellner | July 8, 1919 |
| 1,386,611 | Ely | Aug. 9, 1921 |
| 1,622,776 | Fisher | Mar. 29, 1927 |
| 1,869,512 | Schnabl | Aug. 2, 1932 |
| 2,133,598 | Torbert | Oct. 18, 1938 |
| 2,261,978 | Dirksen | Nov. 11, 1941 |
| 2,430,551 | Arnold et al. | Nov. 11, 1947 |
| 2,444,457 | Marks et al. | July 6, 1948 |

FOREIGN PATENTS

| Number | Country | Date |
| --- | --- | --- |
| 306,297 | Great Britain | Feb. 21, 1929 |

OTHER REFERENCES

Central Instrument Co., Catalogue h–481 (1948), Chicago, page 260. (Copy in Design Division.)